United States Patent [19]

Schmitt et al.

[11] Patent Number: 5,073,225
[45] Date of Patent: Dec. 17, 1991

[54] FIRST STAGE TIRE BUILDING MACHINE INCLUDING SELECTIVELY COUPLED BEAD SETTERS AND BLADDER CAGES

[75] Inventors: Larry D. Schmitt; David W. Bailey, both of Ontario, Canada

[73] Assignee: The Uniroyal Goodrich Tire Company, Akron, Ohio

[21] Appl. No.: 317,874

[22] Filed: Mar. 2, 1989

[51] Int. Cl.$^5$ .............................................. B29D 30/32
[52] U.S. Cl. ................................... 156/401; 156/403; 156/131; 156/132
[58] Field of Search ................................. 156/398–403, 156/414, 415, 417, 421.4, 131, 132, 133, 130.7, 135, 110.1, 394.1

[56] References Cited

U.S. PATENT DOCUMENTS

| | | |
|---|---|---|
| 3,784,437 | 1/1974 | Appleby et al. |
| 3,944,456 | 3/1976 | Cantarutti |
| 4,264,387 | 4/1981 | Allitt .................. 156/40.3 X |
| 4,427,473 | 1/1984 | Shichman et al. |
| 4,584,038 | 4/1986 | Enders |
| 4,830,693 | 5/1989 | Okalaji et al. .............. 156/401 X |

FOREIGN PATENT DOCUMENTS

| | | | |
|---|---|---|---|
| 1158969 | 12/1983 | Canada | 156/463 |
| 61-139429 | 6/1986 | Japan | 156/415 |

*Primary Examiner*—Geoffrey L. Knable
*Attorney, Agent, or Firm*—Michael J. Colitz, Jr.; Alan A. Csontos

[57] ABSTRACT

An improved machine for fabricating tire carcasses. The machine comprises in combination a rotatable main drum upon which ply material is laid up; auxiliary drums of a reduced diameter axially aligned at the ends of the main drum to define therebetween a step for the placement of bead rings; electro magnetic bead setters reciprocable from retracted positions axially exterior of the main and auxiliary drums and advanced positions to move magnetically supported bead rings to the step between the drums; bladders positionable between radially interior and exterior positions with regard to main drum whereby their inflation will turn up the edges of the ply material to encompass the bead rings at the steps and fabricate the tire carcass; bladder cages reciprocable to guide the inflation of the bladders; drive means to reciprocate the bladder cages between the retracted and advanced positions; and means to couple and uncouple the bladder cages and bead setters whereby the bead setters may reciprocate with the bladder cages during the bad setting and the bladder cages may reciprocate independently of the bead setters during edge turn up. Also disclosed is a method of fabricating tire carcasses.

3 Claims, 3 Drawing Sheets

FIRST STAGE TIRE BUILDING MACHINE INCLUDING SELECTIVELY COUPLED BEAD SETTERS AND BLADDER CAGES

BACKGROUND OF THE INVENTION

This invention relates to an improved tire building machine and method of use and, more particularly, to a first stage tire building machine designed to accurately place tire beads on laid up plies of tire material and to turn up the ply edges of the material around the beads to form a carcass.

DESCRIPTION OF THE BACKGROUND ART

In the manufacture of tires, it is a conventional practice to apply one or more tire layers of tire ply material in cylindrical form on the surface of a rotatable tire building drum with the edges of the plies extending axially beyond the ends of the drum. Thereafter, inextensible tire beads are positioned at the ends of the drum. The ply edges are then turned up and stitched around the beads and onto the outer surface of the tire material. Although most first stage tire building machines share this common practice, the method of, and apparatus for, application of such beads and the turning up of the ply edges differ significantly.

One type of tire building machine presently employed for bead setting and turn-up purpose includes a rotatable drum with expandable bladders at its ends. When in proper position and inflated, the bladders cause previously turned down ply edges to be turned up about their previously set beads at the ends of the drum. The beads are set in place by axially moveable magnets positioned adjacent to the ply edges. As the bead setting devices move over the ply material, the beads are pressed into place in anticipation of the ply edge turn ups.

Various approaches are disclosed in the patent literature and are commercially available to improve the accuracy, convenience and economy of bead setters and turn up mechanisms. By way of example, note U.S. Pat. No. 3,784,437 to Appleby; U.S. Pat. No. 3,944,456 to Cantarutti; U.S. Pat. No. 4,427,473 to Shichman and U.S. Pat. No. 4,584,038 to Enders. Each of these devices discloses a bead turn-up mechanism formed of an inflatable bladder and include mechanisms for supporting the beads in position prior to and/or during the turn-up process.

Although many of the known devices are noteworthy to one extent or another, none are as efficient, accurate, inexpensive and convenient to use as that disclosed herein. The background art does not suggest the present inventive combination of component elements arranged and configured as disclosed and claimed herein. The present invention achieves its intended purposes, objectives and advantages over the prior art techniques through a new, useful and unobvious combination of component elements and method steps.

Therefore, it is an object of this invention to provide a method and apparatus for an improved tire building machine comprising in combination a first drum rotatable upon its axis upon which ply material is laid up; second drums of a reduced diameter axially aligned at the ends of the first drum to define therebetween a step; bead setters reciprocable between first positions and second positions to move supported beads to the step; bladders positionable whereby their inflation will turn up the edges of the ply material to encompass the bead rings; and bladder cages reciprocable with, or independent of, the bead setters to guide the inflation of the bladders.

It is a further object of this invention to magnetically support and set beads in position adjacent ply edges of a tire prior to the bead turn-up operation.

It is a further object of the present invention to turn up the edges of ply material in an improved manner with the beads previously set in place.

It is a further object of the present invention to set beads and turn up edges of tire ply material on a first stage tire building machine more accurately, efficiently, conveniently and economically.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved machine for fabricating tire carcasses. The machine comprises in combination a rotatable main drum upon which ply material is laid up; auxiliary drums of a reduced diameter axially aligned at the ends of the main drum to define therebetween a step for the placement of bead rings; electro magnetic bead setters reciprocable from retracted positions axially exterior of the main and auxiliary drums and advanced positions to move magnetically supported bead rings to the step between the drums; bladders positionable between radially interior and exterior positions with regard to main drum whereby their inflation will turn up the edges of the ply material to encompass the bead rings at the steps and fabricate the tire carcass; bladder cages reciprocable to guide the inflation of the bladders; drive means to reciprocate the bladder cages between the retracted and advanced positions; and means to couple and uncouple the bladder cages and bead setters whereby the bead setters may reciprocate with the bladder cages during the bead setting and the bladder cages may reciprocate independently of the bead setters during edge turn up.

The present invention may also be incorporated into a tire building machine comprising in combination a first drum rotatable upon its axis upon which ply material is laid up; second drums of a reduced diameter axially aligned at the ends of the first drum to define therebetween a step; bead setters reciprocable between first positions and second positions to move supported beads to the step; bladders positionable whereby their inflation will turn up the edges of the ply material to encompass the bead rings; and bladder cages reciprocable with, or independent of, the bead setters to guide the inflation of the bladders.

Further, the present invention may be incorporated into an improved tire building machine further includes coupling means to releasably join the bead setters and bladder cages during their reciprocation while bead setting. The coupling means is adapted to uncouple the bead setters and bladder cages during reciprocation of the bladder cages for edge turn up. The coupling means is a pin reciprocable radially by a solenoid and a slot in the bead setter adjacent to the pin. The bead setters are each rings with electromagnets energizable to hold a bead ring when positioning the bead ring on the step and de-energizable after positioning the bead ring on the step.

Lastly, the invention may also be incorporated into a method of fabricating tire carcasses on a tire building machine comprising the steps of providing a rotatable main drum upon which ply material is laid up; providing auxiliary drums of a reduced diameter axially aligned at the ends of the main drum to define therebetween a step for the receipt of beads; axially reciprocating electro magnetic bead setters between retracted positions axially exterior of the main and auxiliary drums and advanced positions to move magnetically supported beads to the step between the drums; expanding bladders positioned between radially interior and exterior positions with regard to the main drum whereby its inflation will turn up the edges of the ply material to encompass the bead rings and fabricate the tire carcass; and axially reciprocating bladder cages to guide the inflation of the bladders. The method further includes the steps of coupling the bead setters and bladder cages for concurrent reciprocation during the setting of the beads. The method further includes the step of uncoupling the bladder cages from the bead setters during the expanding of the bladders.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent method steps and constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several Figures.

DETAILED DESCRIPTION OF THE INVENTION

Figure 1:
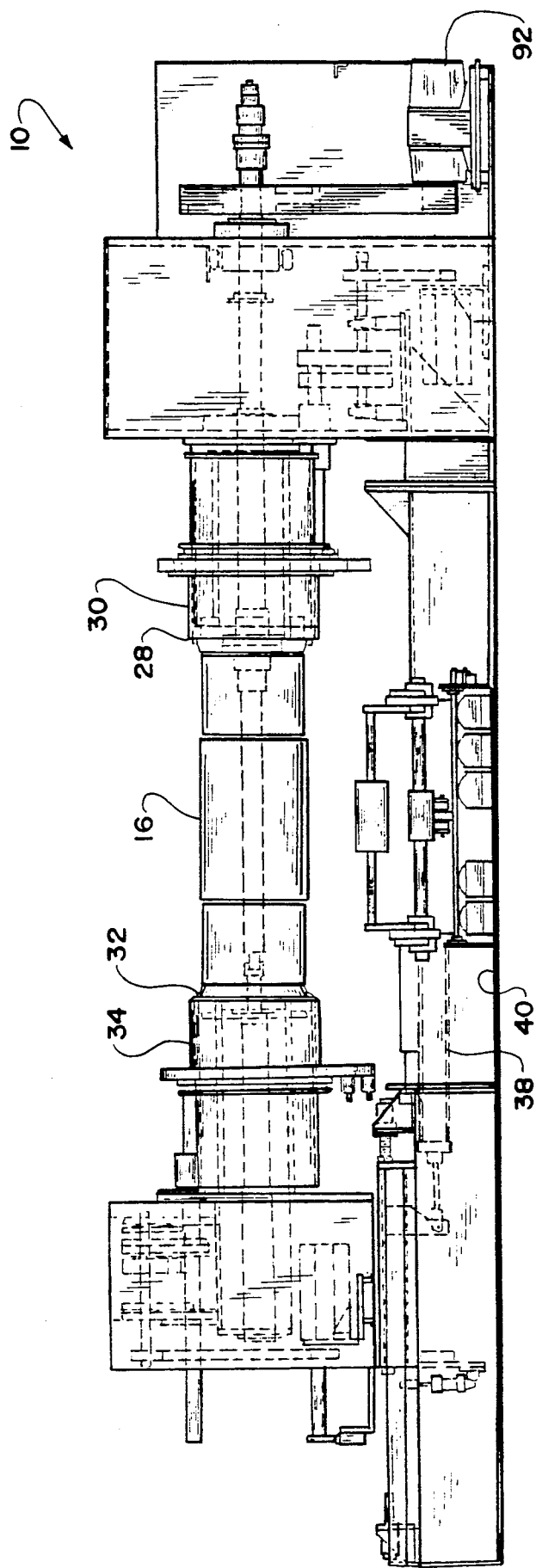
FIG. 1 is an elevational view of a first stage tire building machine with bead setting and turn-up mechanisms constructed in accordance with the present invention.

With particular reference to the drawings, there is shown in FIG. 1 a first stage tire building machine 10. The machine is generally conventional except for the bead setter mechanisms 12 and ply turn up mechanisms 14. The central portion of the tire building machine is the rotatable, inflatable main drum 16 upon which layers or plies of sheet material 20 and beads 22 are placed in the fabrication of the tire carcass 24 for use in further processing.

Figure 2:
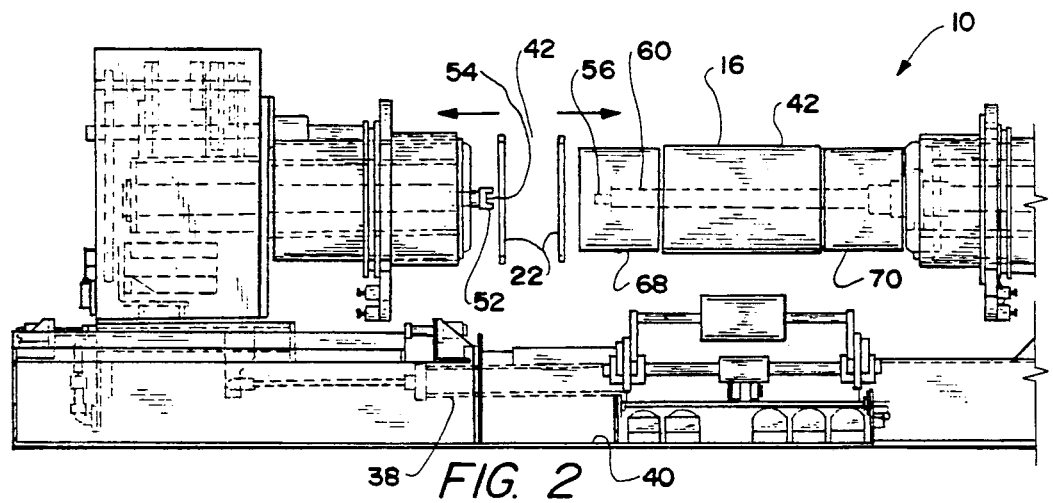
FIG. 2 is an elevational view of the left hand side of tire building machine shown in FIG. 1 but with the left-hand support assembly retracted for placing beads thereon and for removing the assembled tire carcass therefrom.
Figure 3:
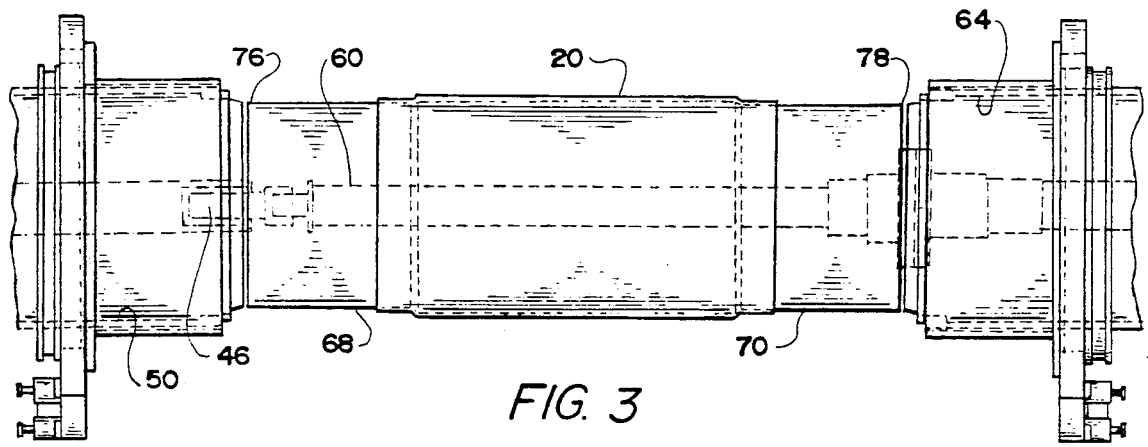
FIG. 3 is an elevational view of a central portion of a tire building machine shown in FIGS. 1 and 2, but with the plies laid up in tire carcass configuration prior to the setting of the beads.

The tire building drum is supported at a first end, the right end 28 as seen in FIG. 1, by a fixed support 30 is cantilevered fashion. The opposite end 32 of the drum 16 is supported by a reciprocable support 34 as seen at the left end of FIG. 1. The reciprocable support 34 may be moved between an advanced position as shown in FIGS. 1 and 3 and a retracted position as is shown in FIG. 2. A pneumatic cylinder 38 in the machine base 40 couples the reciprocable support 34 between these two (2) positions. When in the advanced position, the exterior surface 42 of the drum 16 may be inflated and rotated for the laying up of the sheet material to form the tire carcass 24 in the conventional manner. When the reciprocable support 34 is in the retracted position, a space 42 is formed between the reciprocable support 34 and the main drum 16 whereby cylindrical beads 32 may be laterally placed on bead setter mechanisms 12 in operative position with respect to the drum 16 and whereby the formed tire carcass may be removed from the assembly.

The reciprocable support 34 includes a central shaft 46 mounted in a bearing assembly 48 in the support frame 50 axially reciprocable therewith. Its outboard end 52 is configured with a recess 54. It releasably couples with a projection 56 the outboard end of the central drive shaft 60 which extends in cantilevered fashion from a bearing assembly 62 in its fixed support frame 64. The drive shaft 60 mounts the tire building drum 16 for rotation therewith during fabrication of a tire carcass.

Figure 4:
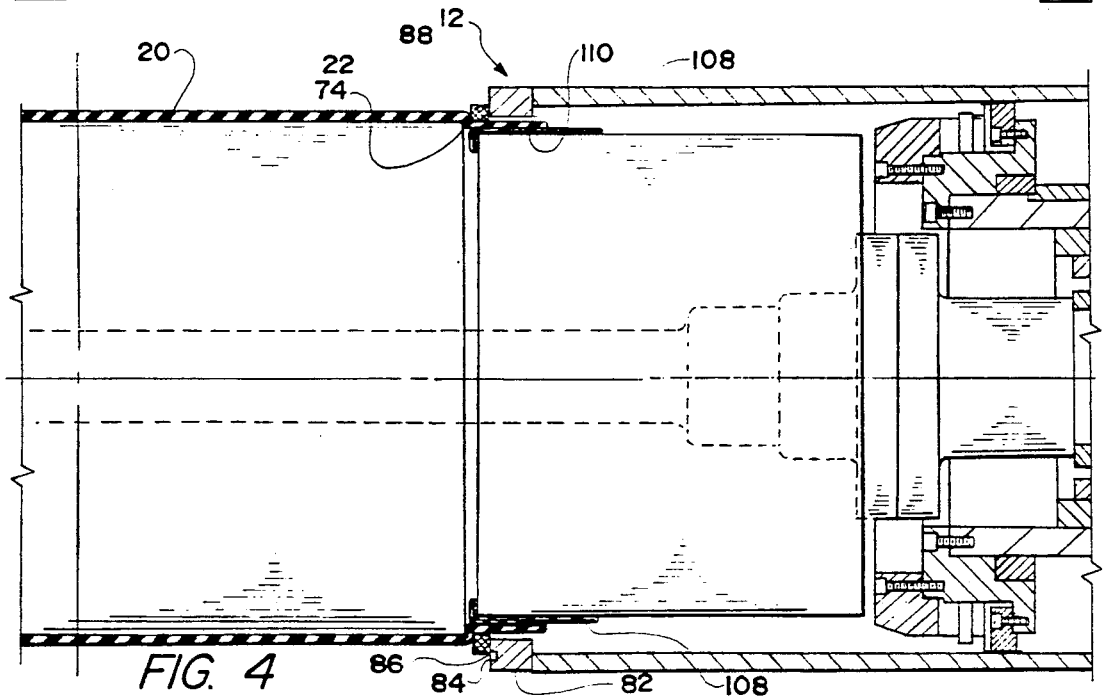
FIG. 4 is an enlarged view of a bead having been pushed forward into operative position and set adjacent to an edge of the plies laid up on the drum.
Figure 5:
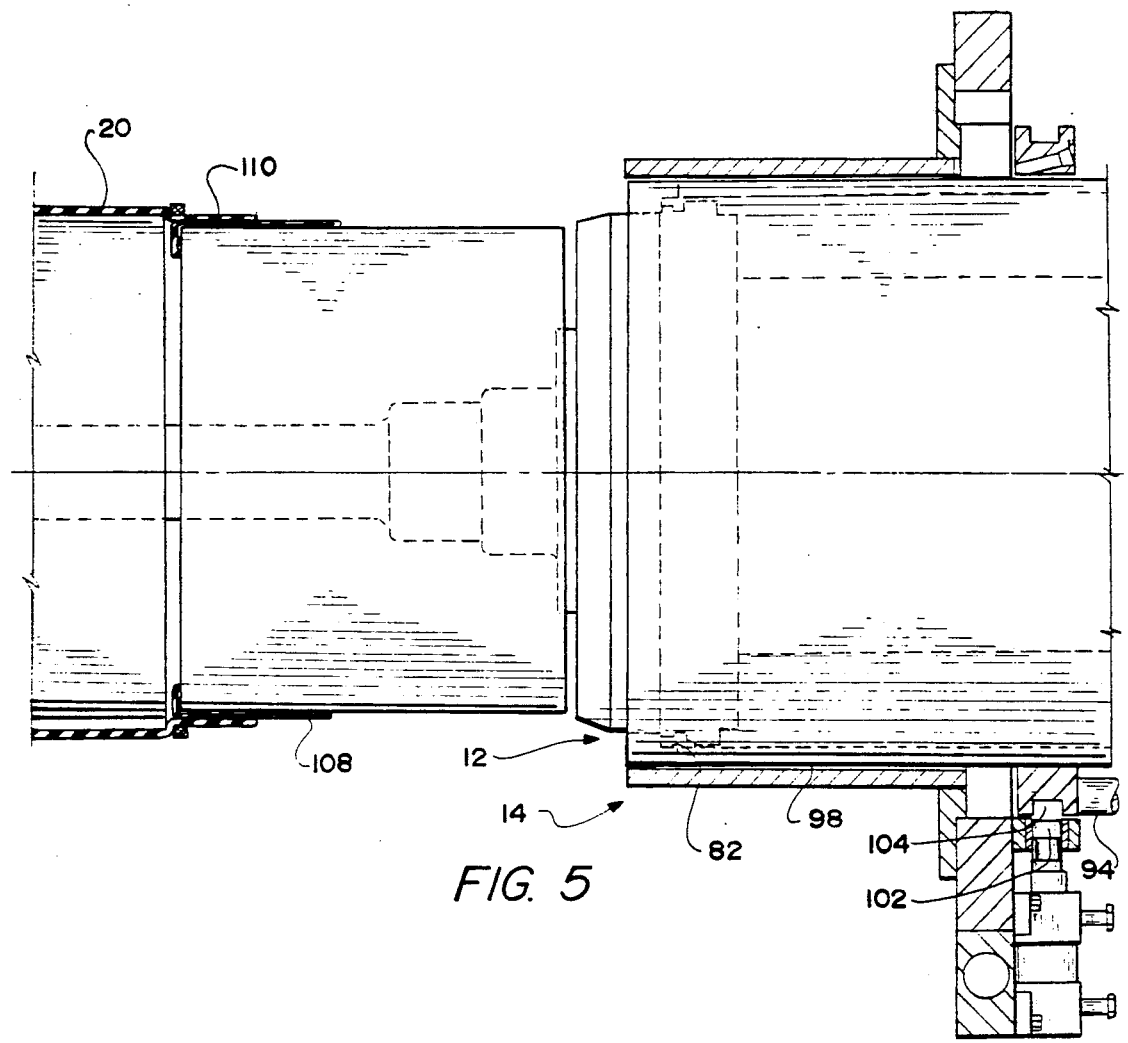
FIG. 5 is an enlarged sectional view of the bead having been set, the bead setting mechanism having been retracted and the bladder case also retracted.

On opposite sides of the main drum 16 are the auxiliary drums 68 and 70 mounted on shaft for rotation with the main and auxiliary drums 16, 68 and 70. The diameters of the auxiliary drums 68 and 70 are slightly reduced with respect to the main drum 16. Such a relationship allows for a step 74 at the interface between the main drum and auxiliary drums for the proper placement of a bead core or bead 22 over the laid-up plies 20 of the carcass 24 during fabrication. This relationship is shown more clearly in FIGS. 4, 5 and 6. These figures only show the right hand end of the tire building machine, but the left hand end is of a similar construction.

The configuration of the drums 68 and 70 when separated as shown in FIG. 2 is sufficient to allow the placement of cylindrical beads or bead cores 22 at the axial ends 76 and 78 of the auxiliary drum adjacent to the bead setters or setter mechanisms 12. Note FIGS. 4, 5 and 6. The bead core setter mechanisms are each a cylinder 82 formed with an external cylinder 84 supporting a plurality of permanent, earthen magnets 86 and a plurality of electromagnets 88 placed around its peripheral surface. The relationship is such that when energized, the electromagnets 88 are sufficient to hold the bead cores 22 in proper retracted orientation axially removed from the drum as shown in FIG. 3. With the bead cores 22 being placed in their retracted position, the pneumatic cylinder 38 is actuated to move the reciprocable support 34 and left hand auxiliary drum 68 between the retracted and advanced position. Compare FIGS. 2 and 3.

With the main and auxiliary drums 16, 68 and 70 in a coupled orientation, the drive motor 92 is energized in three-hundred and sixty degrees (360%) rotations so that an operator may place the particular layers of ply material 24 over the main drum 16 with the material on its surface extending onto the surface of the auxiliary drums 68 and 70. Thereafter, the bead setter mechanisms 12 are advanced by a ball screw 94 to axially shift the beads 22 concurrently into proper orientation at the step 74 between the main and supplemental drums. Note in particular FIG. 4. In this location, the electromagnets 88 are de-energized to allow the bead cores 22 to be retained in position, being wedged into the laid-up material 20 on the steps 74 of the drum ends.

The bead setter mechanisms 12 are then retracted. During this initial movement or setting of the beads 22, the bladder cages 98 of the ply turn up mechanisms 14 are moved concurrently therewith. The bladder cages 98 are cylindrical members positioned radially exterior of the bead setters 82. The coupling of the bead core setters 82 and bladder cages is effected through a pin 102 movable radially with respect to the drum between advanced and retracted positions. In the advanced positions the pin enters recess 104 and couples a setter 82 and cage 98. In the retracted position, the setter and cage are separate. A solenoid 106 drives the pin between these two position.

Figure 6:
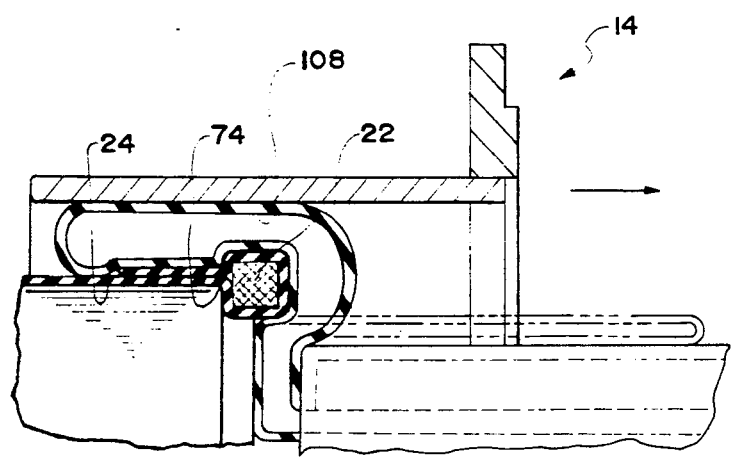
FIG. 6 is an enlarged view of the bladder cage advanced for guiding the bladder as it acts to turn up the edge of the ply material around the bead core.

A common drive mechanism, ball screw 94, functions to move the bead setters 82 and bladder cages 98 over the step 74 of the drums radially exterior of the carcass 24 when advanced. When a solenoid is energized to retract the pin 102, the bead setter 82 becomes separated from the bladder cage 98. The cage 98 can then move independently of the setter 82 to the advanced operative position shown in FIG. 6. With the cages 98 in such position, the bladders 108 are inflated to raise the edge material 110 of the carcass around the bead 22 as shown in FIG. 6. Each bladder 108 is normally retained uninflated in the circumferential space between the main and auxiliary drums 16, 68 and 70. The movement of the bladder 108 being inflated is constrained to the intended position due to the interference positioning of the cage 98. With the bladder 22 having been inflated to properly position, the edge material 110 of the laid-up material is turned up around the bead 22. Both beads 22 are concurrently turned up by their individual circumferential bladders 108 and cages 98. The bladder 108 is then deflated and the cage 98 is retracted by its drive mechanism 94 to the position as shown in FIGS. 3 and 1. During deflation of the bladders 108, the movement of the cages in combination with the memory of the bladder material will return the bladders 108 to their flat, cylindrical configurations on the exterior surfaces of the auxiliary drums 68 and 70. FIG. 6 shows, in solid lines, the bladder in the inflated orientation as well as, in dotted lines, the bladder in the deflated orientation.

After the retraction of the bladder cages 98, as well as the bead setters 82, and with the bladder 22 deflated, the left hand support 34 may be moved by the pneumatic cylinder 38 to the retracted position as shown in FIG. 2. This allows for the stitching of the carcass edges, deflation of the main drum 16 and the removal of the laid-up carcass 24 and for the placement of the next bead rings 22 adjacent to the magnetized bead setters 82 in anticipation of fabricating the next tire carcass.

The first stage tire building machine of the present invention as described herein is designed to accurately place tire beads on flat, expanding flat or shoulder-type of building drums. The features insure that beads are accurately placed on the bead setter with a fixed inside diameter pilot and held in place with a combination of electro and permanent magnets and steel pins. The same mechanism is used to position the bead on the drum and roll over the building drum bladder during the turn up phase. The bead holder assembly is disconnected and remains retracted. The bead hold over assembly is always guided from the building drum support shaft assembly keeping the bead holder concentric to the building drum.

The present disclosure includes that contained in the appended claims as well as that of the foregoing description. Although this invention has been described in its preferred forms with a certain degree of particularly, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. A machine for fabricating tire carcasses comprising in combination:

a rotatable main drum upon which ply material is laid up;

auxiliary drums of a reduced diameter axially aligned at the ends of the main drum to define therebetween a step for the placement of bead rings;

magnetic bead setters reciprocable from retracted positions axially exterior of the main and auxiliary drums and advanced positions to move magnetically supported bead rings to the step between the drums;

bladders positionable between radially interior and exterior positions with regard to main drum whereby their inflation will turn up the edges of the ply material to encompass the bead rings at the steps and fabricate the tire carcass;

bladder cages reciprocable to guide the inflation of bladders;

a single, common drive means to reciprocate each bladder cage between the retracted and advanced positions; and means to selectively couple and uncouple the bladder cages and bead setters whereby the bead setters may reciprocate concurrently with the bladder cages during the bead setting and the bladder cages may reciprocate independently of the bead setters during edge turn up.

2. The tire building machine as set forth in claim 1 wherein the means to selectively couple is a pin reciprocable radially by a solenoid and a slot in the bead setter adjacent the pin.

3. The tire building machine as set forth in claim 1 wherein the bead setters are each rings with electromagnets energizable to hold a bead ring when positioning the bead ring on the step and de-energizable after positioning the bead ring on the step.

* * * * *